US007526847B1

(12) United States Patent
Arthur et al.

(10) Patent No.: US 7,526,847 B1
(45) Date of Patent: May 5, 2009

(54) CRANKSHAFT OIL SEAL INSTALLATION DEVICE

(75) Inventors: Randall J. Arthur, Wapakoneta, OH (US); Ryan M. Johnson, Paulding, OH (US); David H. Hook, Wapakoneta, OH (US); Bart L. Anthony, Wapakoneta, OH (US)

(73) Assignee: Honda Motor Co., Ltd., Tokyo (JP)

( * ) Notice: Subject to any disclaimer, the term of this patent is extended or adjusted under 35 U.S.C. 154(b) by 859 days.

(21) Appl. No.: 11/089,946

(22) Filed: Mar. 25, 2005

(51) Int. Cl.
*B23P 19/02* (2006.01)

(52) U.S. Cl. ............................ 29/235; 29/252; 29/450; 29/466; 29/270

(58) Field of Classification Search .................. 29/235, 29/252, 270, 278, 402.02, 402.08, 426.5, 29/450, 464, 466, 468, 888.011, 888.01, 29/6.01
See application file for complete search history.

(56) References Cited

U.S. PATENT DOCUMENTS 2,721,377 A 10/1955 Hedlund
2,958,124 A 11/1960 Hardy
3,029,503 A 4/1962 Meyer
3,171,193 A 3/1965 Bowden
3,206,844 A 9/1965 Bowden
3,490,131 A 1/1970 Sexton
3,564,696 A 2/1971 Shepanski
3,909,916 A 10/1975 Neff et al.
4,457,061 A 7/1984 Eason
4,485,542 A * 12/1984 Vasoll ......................... 29/252
4,551,898 A 11/1985 Provost
4,953,276 A * 9/1990 Kusmer et al. ................ 29/235
5,009,434 A 4/1991 Nash et al.
5,013,050 A 5/1991 Curtis
5,052,695 A 10/1991 Curtis
5,539,979 A 7/1996 Powers
5,709,018 A 1/1998 Dugan
6,065,198 A 5/2000 Vitous et al.
6,266,861 B1 * 7/2001 Chen ........................... 29/261
6,543,113 B1 4/2003 Khurana
6,925,696 B1 * 8/2005 Williams ..................... 29/252

* cited by examiner

*Primary Examiner*—David P Bryant
*Assistant Examiner*—Sarang Afzali
(74) *Attorney, Agent, or Firm*—Standley Law Group LLP

(57) ABSTRACT

An automated crankshaft oil seal installation device and method of installing a crankshaft oil seal therewith. The device and method of the present invention allows an oil seal to be quickly and accurately installed to and around an exposed portion of a crankshaft in a manufacturing setting. One embodiment of the device makes use of a self-retention mechanism to ensure that the device is properly mated to an engine block that houses the crankshaft, and a pneumatic cylinder in combination with an oil seal retention/installation mechanism to install the oil seal.

19 Claims, 10 Drawing Sheets

CRANKSHAFT OIL SEAL INSTALLATION DEVICE

BACKGROUND OF THE INVENTION

The present invention is directed to a device and method for installing an oil seal to a crankshaft. More particularly, the present invention is directed to a device and method for installing an oil seal to the output end of an internal combustion engine crankshaft. The device and method of the present invention is primarily intended for use in a high-volume production setting, but could also be used in repair shops or similar environments.

Internal combustion engines have existed in some form for approximately 200 years. Such engines may take many forms. For example, internal combustion engines may be of the diesel, rotary, gas turbine, two-stroke, or four-stroke variety. Four-stroke internal combustion engines are likely the most common, and serve as the powerplant in the vast majority of today's automobiles. Two-stroke engines can still be found in some motorcycles and in various types of outdoor power equipment. Diesel engines are typically used to power trucks and other heavy equipment, and are also used in a smaller percentage of automobiles. Gas turbine engines are generally used to power aircraft, such as jet aircraft and helicopters, and can also be used to power electric generators and other rotationally-driven devices.

While the overall operation of these aforementioned internal combustion engines may vary considerably, they all have one thing in common: the power generated by each engine is delivered via some form of shaft. In the four-stroke internal combustion engine, for example, engine power is commonly delivered to a drive system by means of a crankshaft. The crankshaft is typically connected by one or more connecting rods to a like number of pistons that reciprocate within respective cylinder bores in an engine block. A mixture of fuel and air is admitted into the cylinder bore(s) in an area above each piston, where it is ignited and exploded. The explosion of fuel causes reciprocation of the piston(s), and a resulting rotation of the crankshaft. The crankshaft rotates within the engine block, where it may be supported by a number of bearings. A lubricant, such as motor oil, is normally provided within the engine block to facilitate rotation and cooling of the crankshaft and related components.

In order to transfer engine power to an external mechanism, such as the wheels of an automobile, at least one end of the crankshaft must typically protrude through the engine block (or must be accessible through the engine block). In an automobile, for example, at least one end of the crankshaft is usually coupled to a manually or automatically shifted transmission. As can be understood from the foregoing description of such an engine, however, extending the crankshaft through the engine block can be problematic due to the presence of motor oil within the engine block. More specifically, the opening between the engine block and the crankshaft invites oil leaks and, therefore, must be sealed. With respect to an automobile engine, this seal is often referred to as the rear main bearing oil seal, or the rear main seal.

Sealing the gap between the crankshaft and the engine block has been a problem since the early days of internal combustion engine usage. Prior to the development of suitable rubber and polymer materials, sealing was typically accomplished by inserting a piece of specialized rope between the crankshaft and the surrounding aperture in the engine block. The size of the rope was selected to fit tightly therebetween. Early rubber and polymer seal designs typically mimicked the earlier rope seals, in that they commonly took the shape of long strands or bands that were pulled around the circumference of the crankshaft in the area to be sealed, and then were subsequently cut to proper length.

Modern oil seals are much more advanced in design, and offer far superior sealing abilities and a longer service life. Today's crankshaft oil seals generally employ a polymer material, and may incorporate a metal support wire or may be joined to a metallic ring that gets pressed into a receiving aperture in the engine block. A metallic ring may be present along the outer diameter of the seal, the inner diameter of the seal, or both.

While such seals are generally superior in both their sealing abilities and service life, they must be properly installed in order to produce the desired effect. More specifically, when an oil seal includes an outer metallic ring, there will generally be some resistance to insertion thereof by the receiving aperture in the engine block. This resistance allows the oil seal to be adequately retained within the aperture. If proper measures are not taken during installation, however, it is possible for the resistance between the oil seal and the aperture to cause installation of the oil seal in an angled or "cocked" position—which can detrimentally affect the sealing abilities of the oil seal. It is also sometimes possible, depending on the design of the oil seal and the aperture in the engine block, to install the oil seal to an incorrect depth (i.e., too far into the aperture).

Various tools and techniques have in the past been used to assist in properly installing this type of oil seal, including the technique of spanning the oil seal with a board and striking the board with a hammer to drive the oil seal into the aperture. A number of hand operated tools that must be physically fastened to the end of the crankshaft prior to use have also been developed for this purpose.

While these known tools and installation techniques may work acceptably for a one-time installation, or for low volume oil seal installation such as in a typical repair facility, they are not acceptable in a high volume manufacturing setting. For example, quality issues aside, it is not practical to use the board and hammer installation method on an automotive assembly line. Similarly, while some of the hand operated tools mentioned above may improve the resulting quality of the oil seal installation process, there is simply not enough time in a manufacturing setting to fasten and unfasten a tool to the end of the crankshaft during each oil seal installation operation.

Therefore, what is needed, and to Applicants' knowledge has been heretofore unavailable, is an oil seal installation device that not only ensures the proper installation of the oil seal, but also performs the installation with an efficiency that allows its use in a high volume manufacturing environment. The crankshaft oil seal installation device of the present invention satisfies this need.

SUMMARY OF THE INVENTION

The crankshaft oil seal installation device of the present invention, and its method of use, allows a crankshaft oil seal to be automatically and properly installed in a quick and efficient manner. Therefore, the crankshaft oil seal installation device of the present invention is especially well suited to use in a high volume installation operation, such as on an automotive manufacturing assembly line.

The crankshaft oil seal installation device of the present invention is designed to be easily attached to and removed from an engine block, while the engine block is coupled to an assembly line carrier or similar structure. Preferably, the crankshaft oil seal installation device is suspended from above to allow it to be easily manipulated by a user thereof.

The crankshaft oil seal installation device includes an oil seal installation cylinder that is coupled to an oil seal receiving/installation mechanism. The oil seal installation cylinder is coupled to a framework that preferably includes one or more linear guide elements that help to ensure proper movement of various device components.

In operation, the crankshaft oil seal installation device of the present invention is supplied with an oil seal and subsequently moved into contact with the engine block. A self-retention mechanism acts to pull the crankshaft oil seal installation device into tight mating contact with the engine block. Locating elements may be provided on the crankshaft oil seal installation device to engage corresponding structures on the engine block, thereby further ensuring proper alignment of the crankshaft oil seal installation device and oil seal with the engine block and crankshaft.

Once the crankshaft oil seal installation device has been properly installed to the engine block, the user can initiate the actual oil seal installation process. A variety of different interfaces may be provided for allowing a user to operate the device. In one particular embodiment, a pair of handles extend toward a rear portion of the device. The handles facilitate manipulation of the device, and may also include process control buttons or triggers. For example, a button may be provided to initiate the self-retention (clamping) function, to initiate the oil seal installation operation, and to cause the device to release itself from the engine block upon process completion. Once the oil seal installation operation is complete, and the device has been released from the engine block, it may be supplied with a new oil seal in preparation for use on the next engine on the assembly line.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
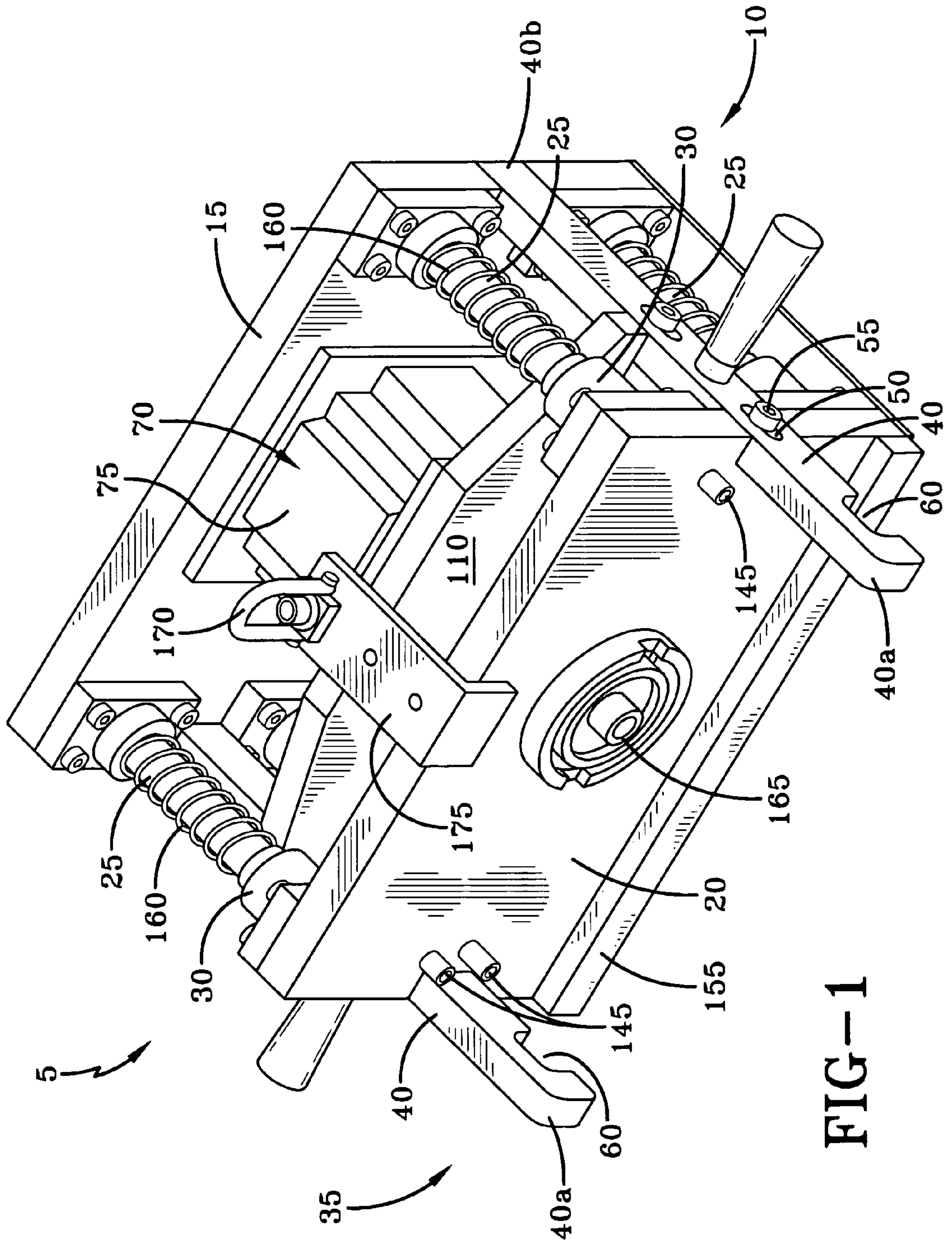
FIG. 1 is a frontal perspective view of an exemplary embodiment of a crankshaft oil seal installation device of the present invention, wherein internal components of the device are shown as visible through cover sections thereof for reasons of clarity.
Figure 2:
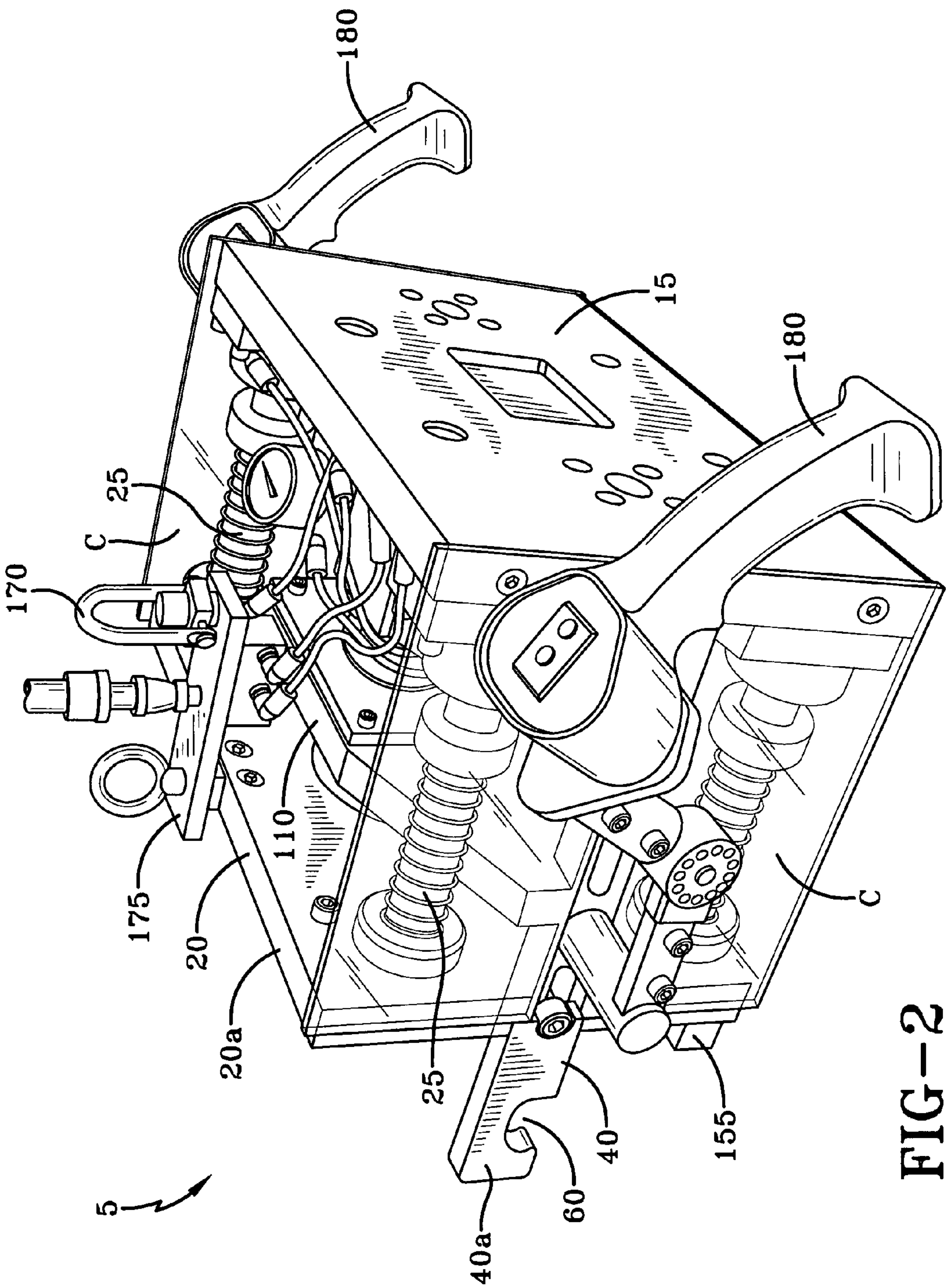
FIG. 2 is a rearward perspective view of the crankshaft oil seal installation device of FIG. 1, wherein internal components of the device are again shown as visible through cover sections thereof for reasons of clarity.
Figure 3:
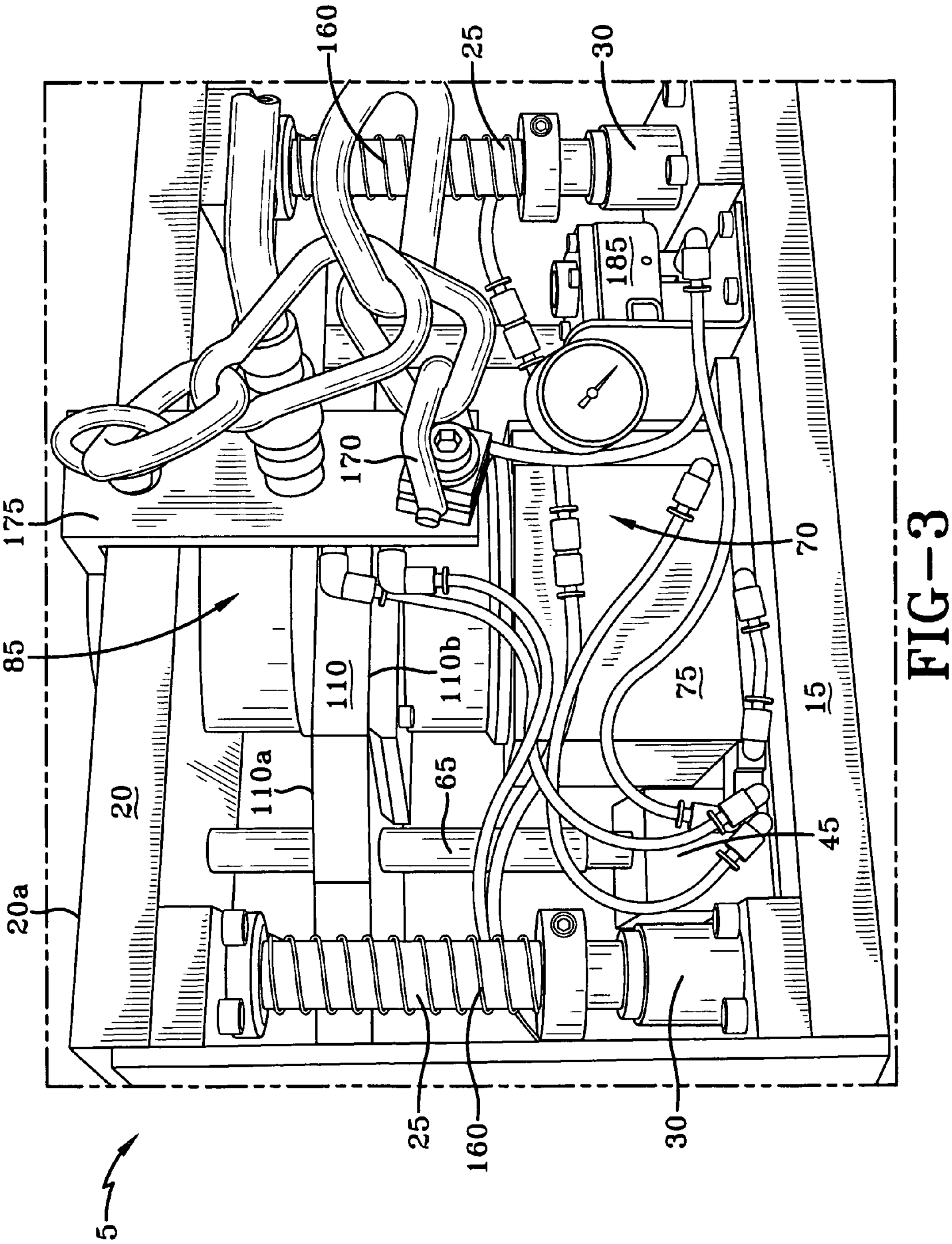
FIG. 3 is a top view of the crankshaft oil seal installation device of FIGS. 1-2.

An exemplary embodiment of an assembled crankshaft oil seal installation device 5 of the present invention can be best observed by reference to FIGS. 1-3. As can be seen, the crankshaft oil seal installation device 5 includes a housing or framework 10 which, in this particular embodiment, comprises a pair of mounting plates 15, 20 and a number of cover plates C. It should be realized that while the use of cover plates C is preferable in order to enhance safety, their presence is not necessary to operation of the device 5. As shown in FIGS. 1-3, the cover plates C may be translucent or, alternatively, may be opaque. The cover plates C may be comprised of plastic, metal, or any of a number of other suitable materials.

The mounting plates include a rear mounting plate 15 and a front mounting plate 20, which are coupled to one another in a moving relationship. In this particular embodiment of the crankshaft oil seal installation device 5, the mounting plates 15, are coupled to one another by four guide rods 25, one of which is attached near each corner of the plates. The guide rods 25 facilitate linear movement of the plates 15, 20 toward and away from each other, while substantially preventing transverse movement thereof. Such guide rods 25 typically include a linear bearing 30 that allows the desired movement. As such guide rods 25 would be well known to one skilled in the art, no further detail need be provided herein.

The crankshaft oil seal installation device 5 is provided with a self-retention mechanism 35 operative to secure the device to an engine block that houses the crankshaft to which an oil seal will be installed. In this particular embodiment of the invention, the self-retention mechanism 35 comprises a pair of clamping arms 40 and a pair of clamping cylinders 45. A clamping arm 40 is located on each side of the crankshaft oil seal installation device 5, with a rear end 40*b* of each arm securely affixed to the rear mounting plate 15. As shown, the clamping arms 40 are secured to the rear mounting plate 15 with bolts. It should be understood, however, that other fastening techniques such as, for example, welding, may also be employed.

A more forward portion of each clamping arm 40 is slidably affixed to the front mounting plate 20 so as to permit some predetermined amount of linear movement thereof. As shown, each clamping arm 40 includes a slot 50 through which a shoulder bolt 55 passes and threads into a like threaded hole in the front mounting plate 20. Of course, other acceptable mounting methods can also be used, and would be obvious to one skilled in the art.

Figure 6:
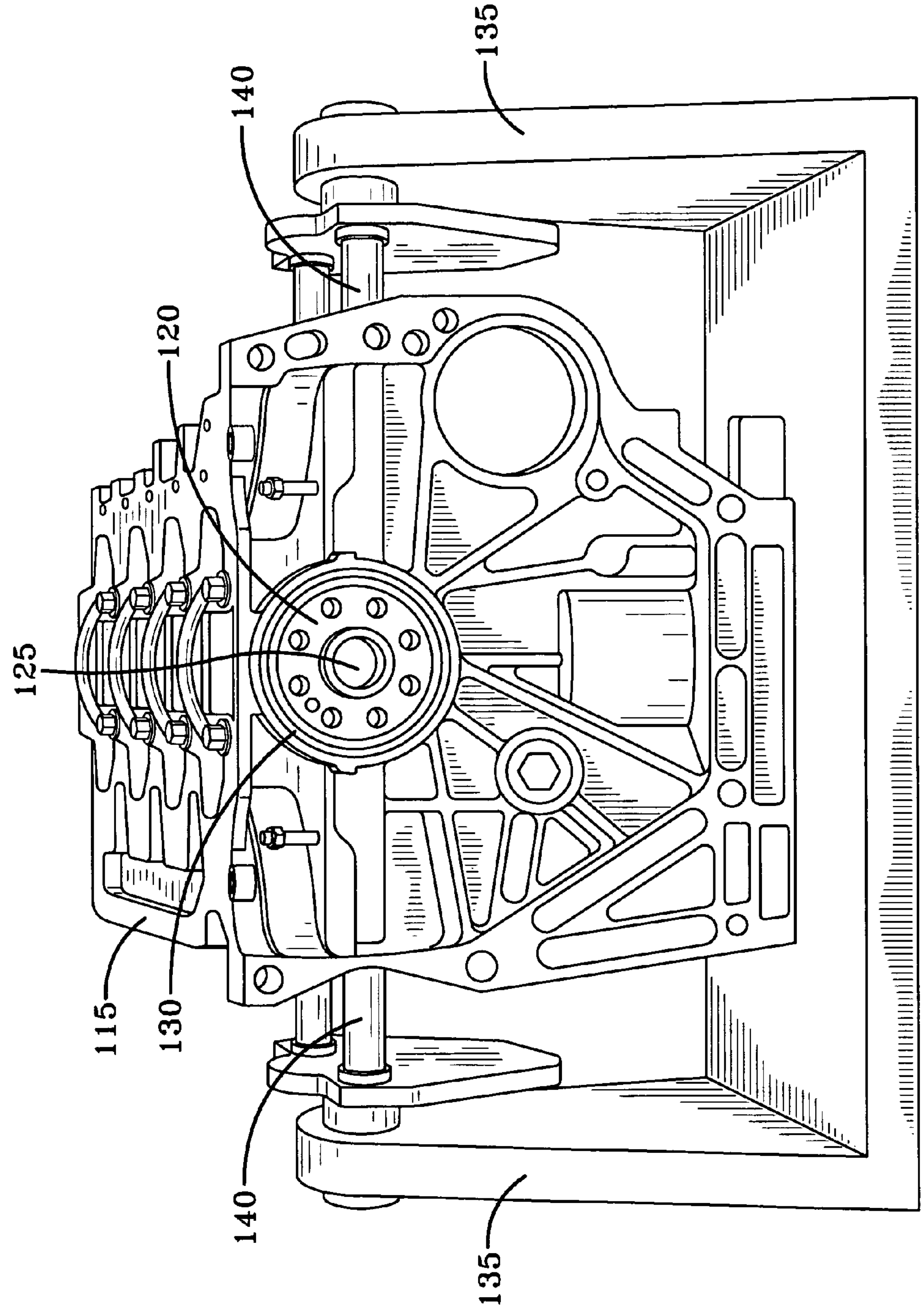
FIG. 6 depicts a rearward end of an engine block having an exposed crankshaft end and aperture to which an oil seal is to be installed.
Figure 7:
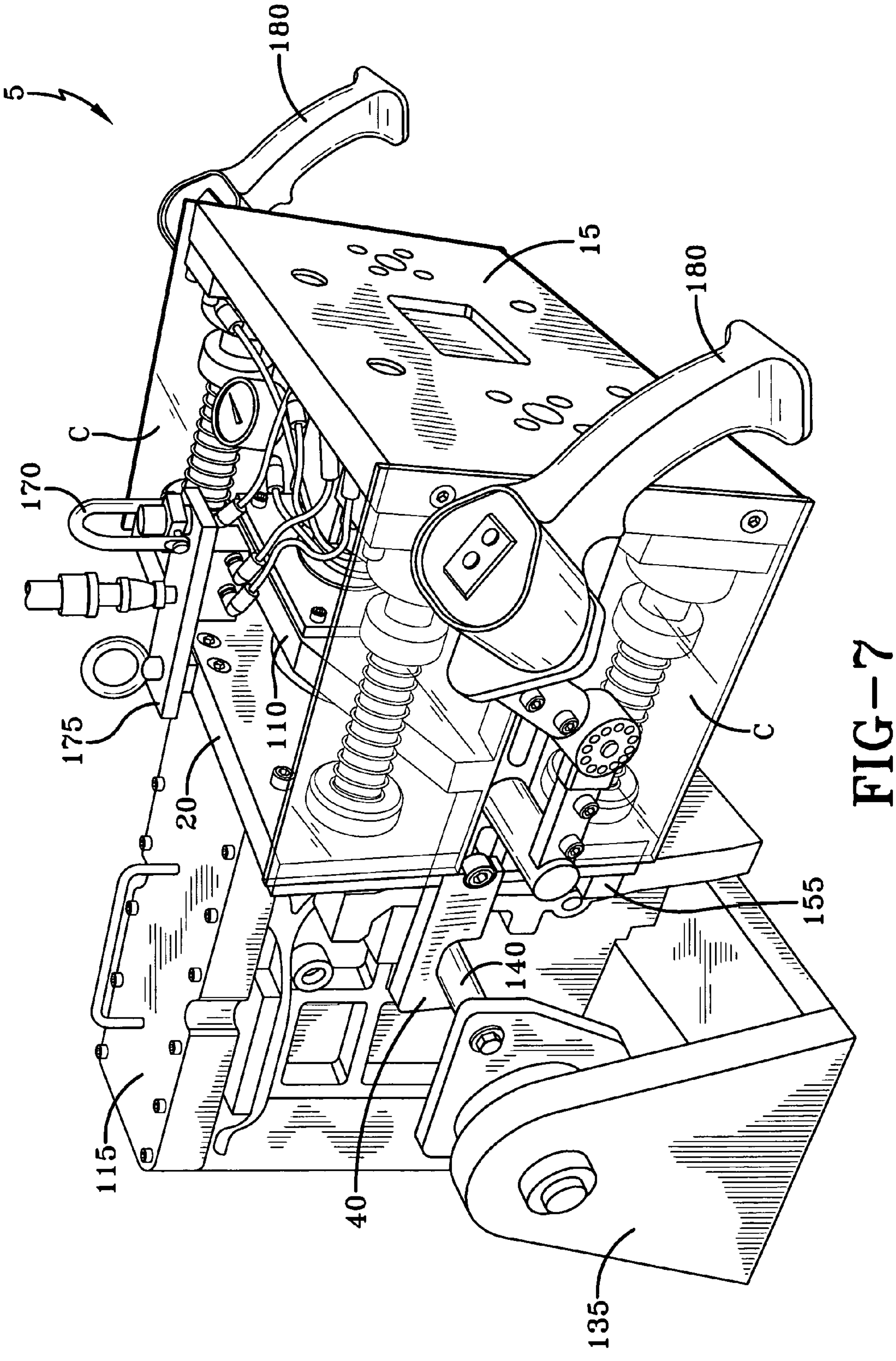
FIG. 7 is a perspective view illustrating the oil seal installation device of the present invention in a retained position on the engine block of FIG. 6 and ready to install an oil seal.
Figure 8:
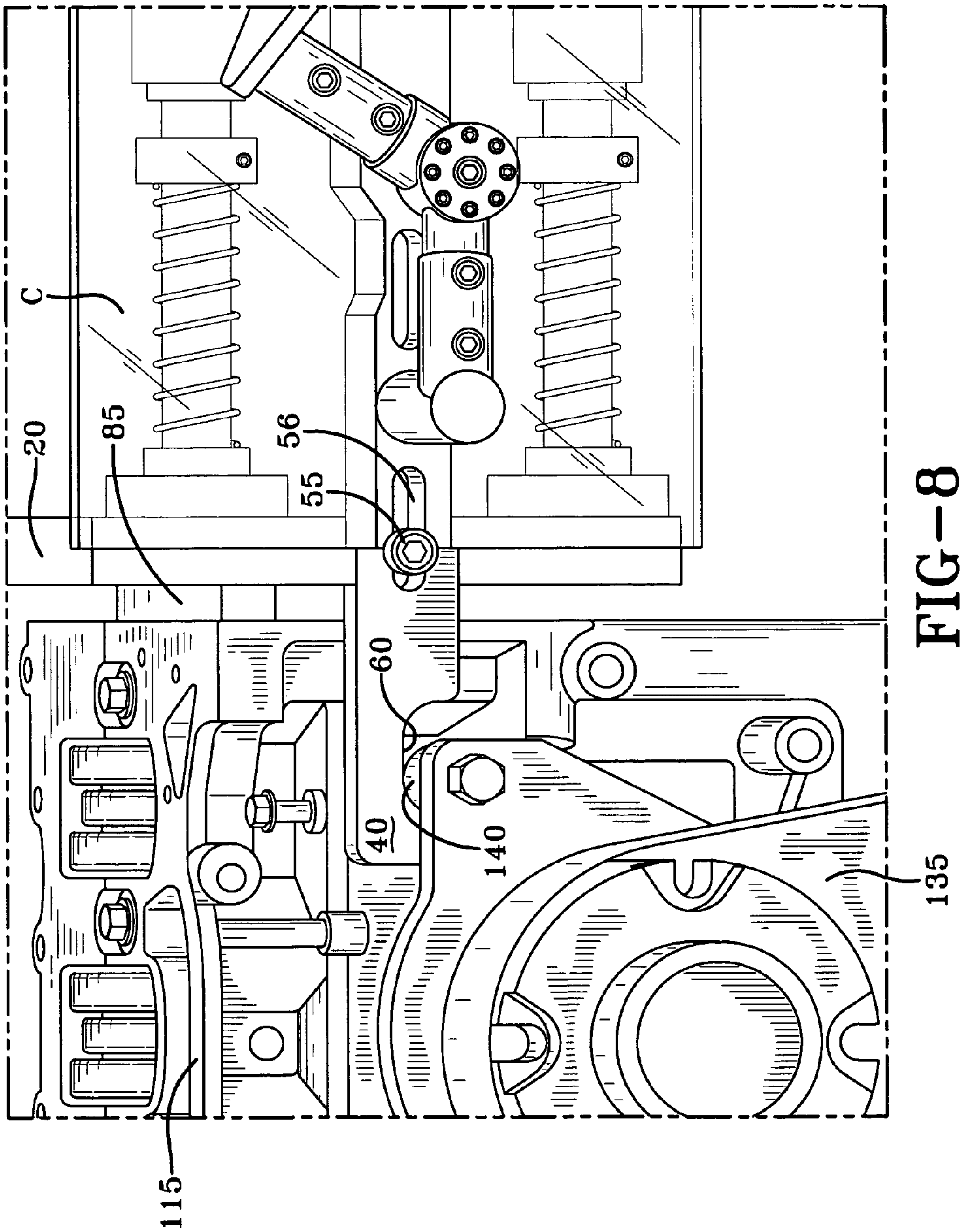
FIG. 8 is a side view of the oil seal installation device in the retained position on the engine block.

A front end 40*a* of each clamping arm 40 is provided with a notch 60, slot, or other feature that allows it to engage a portion of an engine block or, more preferably, a portion of an assembly line engine block carrier (see FIGS. 6-8). For example, as shown in this particular embodiment of the crankshaft oil seal installation device 5, a notch 60 in each clamp arm 40 is provided to engage a support rod 140 that extends from an engine block assembly line carrier 135 and secures an engine block 115 thereto (see FIGS. 6-8).

The body of each clamping cylinder 45 is secured to the rear mounting plate 15, with each respective piston rod thereof 65 extending toward and affixed to the front mounting plate 20. Once the crankshaft oil seal installation device 5 has been preliminarily placed in abutment with the engine block 115, and the clamping arms 40 are engaged with the carrier support rods 140, activation of the clamping cylinders 45 will drive the rear mounting plate 15 and the components attached thereto away from the front mounting plate 20 and the engine block 115. As such movement of the clamping arms 40 will be limited their engagement with the support rods 140, the front mounting plate 20 is eventually drawn into secure contact with the engine block 115, the clamping arms are pulled tightly against the support rods, and the crankshaft oil seal installation device 5 is thereby retained in position upon the engine block. Upon completion of the oil seal installation operation, the clamping cylinders 45 are de-energized or retracted, thereby releasing the crankshaft oil seal installation device 5 from the engine block 115. One or more helper springs 160 may be located around guide the rods 25 or otherwise between the front and rear mounting plates 15, 20 in order to facilitate or assist with the self-retention function.

One or more locating pins 145 or similar elements may be located on the front mounting plate 20. These locating pins 145 are designed to engage or mate with corresponding features at the rear of the engine block 115 and to further ensure proper alignment of the crankshaft oil seal installation device 5 and oil seal 150 with the engine block 115 and crankshaft 120. The locating pins 145 may be comprised of virtually any material. Preferably, however, the locating pins 145 should offer at least some resistance to wear and should not damage the engine block 115 or crankshaft 120 during attachment of the crankshaft oil seal installation device 5 thereto.

One or more pads, or bumpers, may also be located on the front mounting plate 20 so as to help prevent damage to the engine block 115 during attachment of the crankshaft oil seal installation device 5 thereto. While only a single, bottom pad 155, is shown in this particular embodiment of the present invention, multiple pads may actually be arranged across the face of the front mounting plate 20. The bottom pad 155 shown in FIGS. 1-3 acts as a bumper and is located to serve as the point of initial contact between the crankshaft oil seal installation device 5 and the engine block 115 during a typical oil seal installation operation.

Installation of the oil seal (see FIG. 4) is actually accomplished through use of an oil seal installation cylinder 70 and an oil seal retention/installation mechanism 85 (see FIGS. 4-5) that are included components of the crankshaft oil seal installation device 5. As can be seen in FIGS. 1-3, the body 75 of the oil seal installation cylinder 70 is affixed to the rear mounting plate 15, while the piston rod thereof (not visible) is coupled to a rearward side **110*b* of an actuator plate 110. The actuator plate 110 may ride on top of the clamping arms 40** for stability, and the clamping arms may help to guide the actuator plate during oil seal installation.

Figure 4:
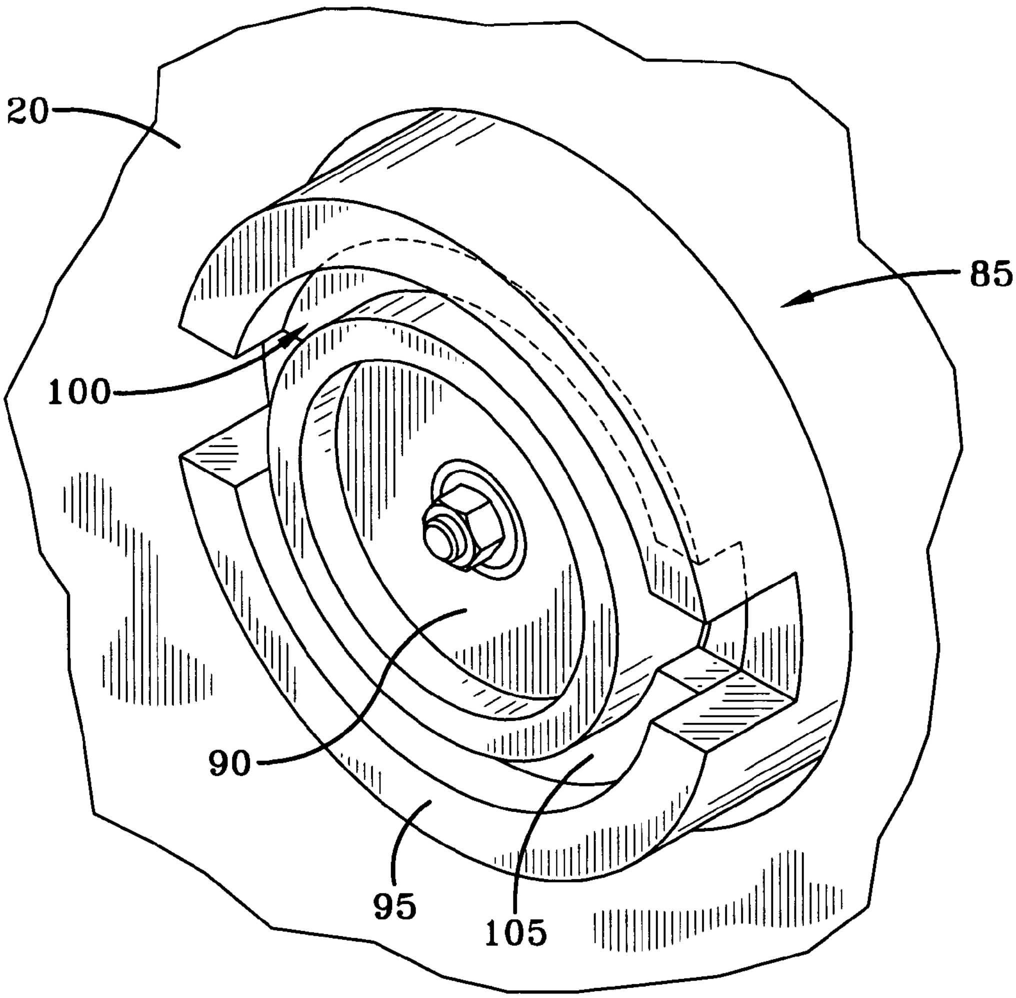
FIG. 4 is an enlarged perspective view illustrating an external portion of an oil seal retention/installation mechanism of the device of FIGS. 1-3, as well as an oil seal to be retained and installed thereby.
Figure 5:
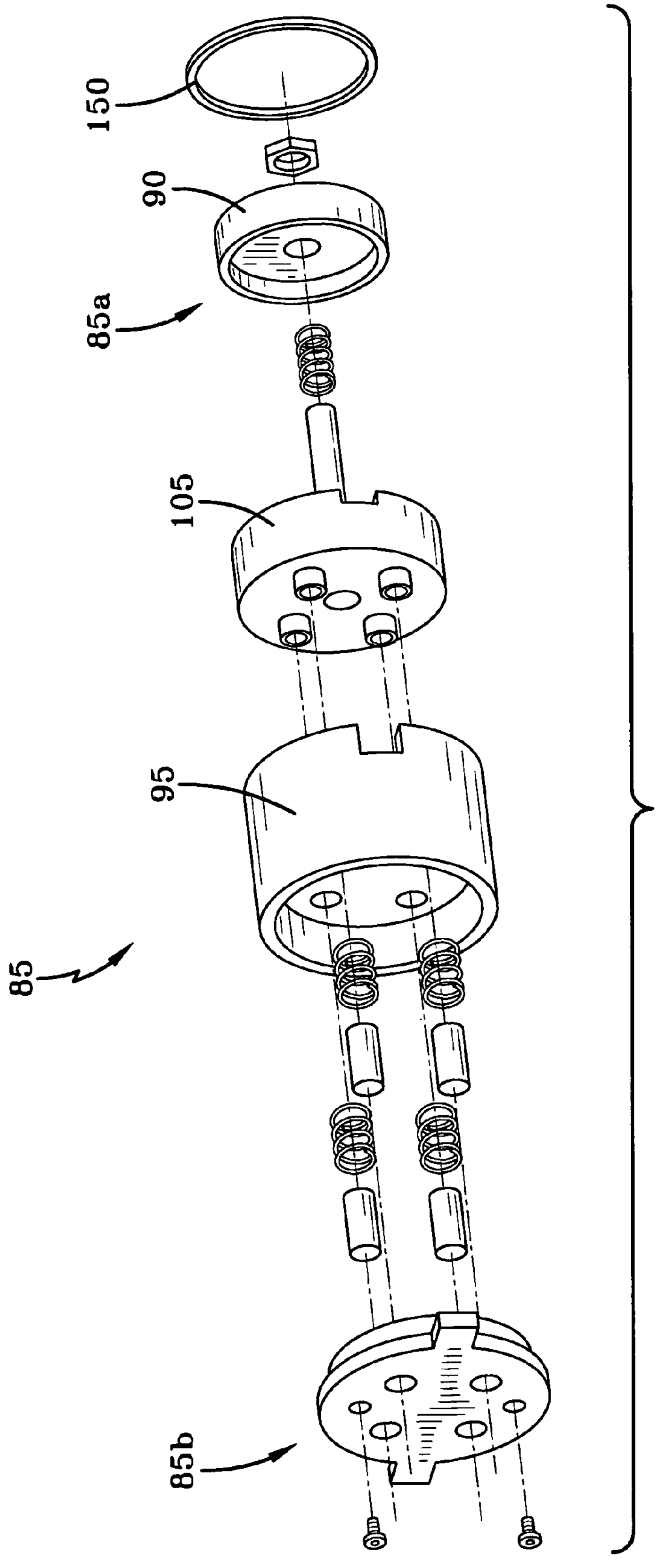
FIG. 5 is an exploded view of the oil seal retention/installation mechanism of FIG. 4.

The oil seal retention/installation mechanism 85 can be best observed by reference to FIGS. 4-5. However, as can be most clearly seen in FIGS. 1-3, a rearward portion **85*b* of the oil seal retention/installation mechanism 85 is affixed to a forward (front) side 110*a* of the actuator plate 110. A forward portion 85*a* of the oil seal retention/installation mechanism 85 passes through the front mounting plate 20, and is adapted to receive and retain the oil seal 150 shown in FIG. 5**.

The oil seal retention/installation mechanism 85 can be seen to have a cylindrical center portion 90 that is preferably of substantially the same outer diameter as the rear of the crankshaft 120 to which the oil seal 150 will be installed. An outer sleeve 95 is concentrically arranged around the center portion 90 of the oil seal retention/installation mechanism 85, such that an oil seal receiving/retention groove 100 is formed therebetween. A plunger sleeve 105 resides in the space between the center portion 90 and the outer sleeve 95 of the oil seal retention/installation mechanism 85. The plunger sleeve 105 is linearly displaceable within the space between the center portion 90 and the outer sleeve 95, such that it can be outwardly extended by the oil seal installation cylinder 70 and caused to install the oil seal 150 over the crankshaft 120 and into the crankshaft oil seal receiving aperture 130. The oil seal retention/installation mechanism 85 may be spring-loaded, as shown, to bias the plunger sleeve 105 toward a receiving position. If the rear of the crankshaft 120 includes one or more recesses 125, apertures, or other features, as shown, a location pin 165 or similar element may be optionally provided on the oil seal retention/installation mechanism 85 to further assist with alignment.

Preferably, the crankshaft oil seal installation device 5 is suspended from a moveable support, such as an intelligent assist device. Such a device supports the weight of the crankshaft oil seal installation device, while simultaneously allowing it to be moved in both a horizontal and vertical direction. Consequently, a user of the crankshaft oil seal installation device 5 can easily and quickly move it from one location to another with little effort. The intelligent assist device, or a similar support device, may be connected to the crankshaft oil seal installation device 5 using a lift ring 170 or other suitable connector. Preferably, the lift ring 170 is adjustable in position to account for the center of gravity of the crankshaft oil seal installation device 5 and the angle at which it is desired to mate the device to the engine block 115. As shown, the distance of the lift ring 170 from the front mounting plate 20 can be varied, such as through use of an adjustable mounting bracket 175, although other adjustments that would be obvious to one skilled in the art could also be provided for.

Figure 9:
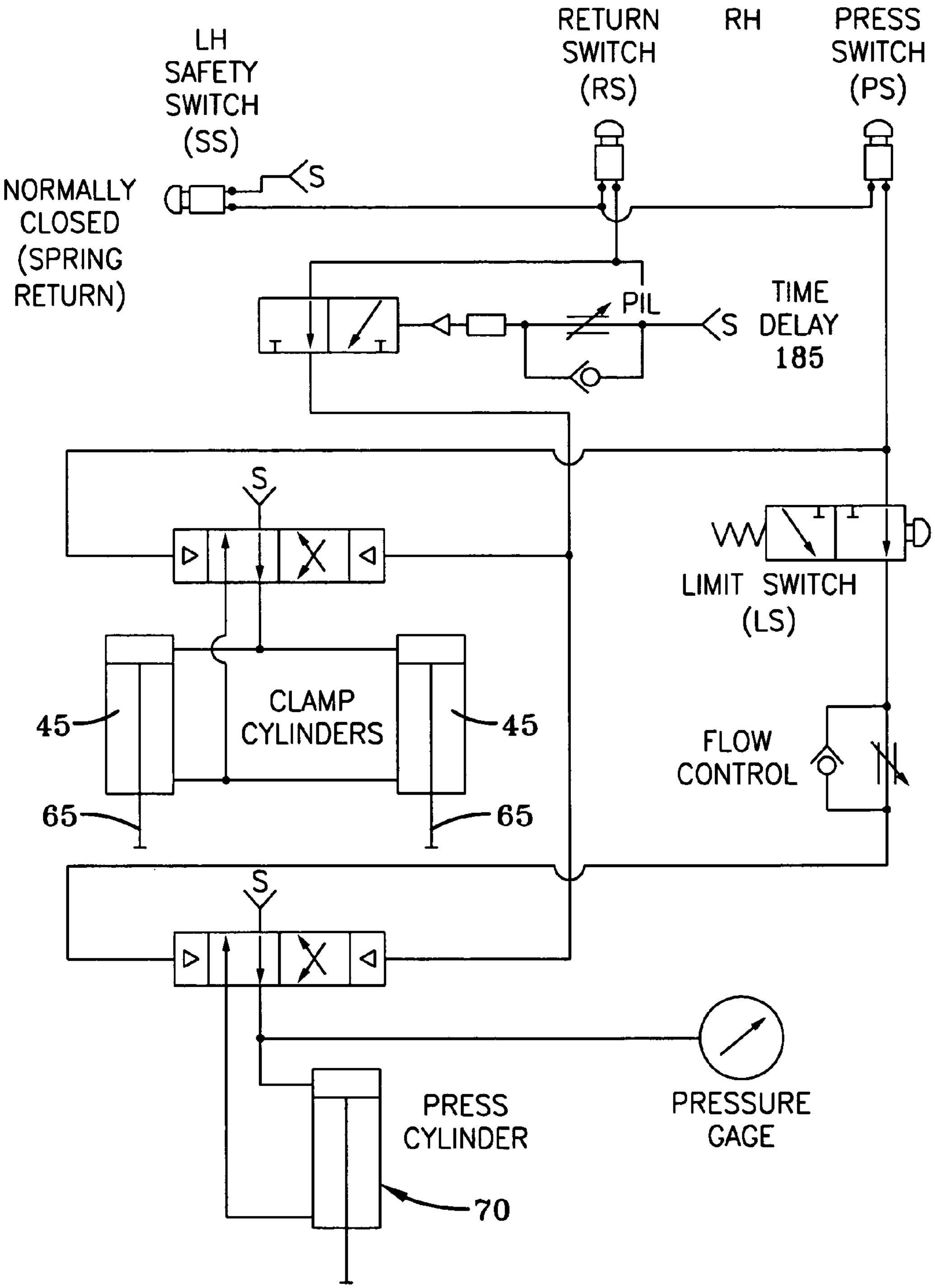
FIG. 9 is a schematic diagram depicting an exemplary fluid circuit that can be used to operate a crankshaft oil seal installation device of the present invention.
Figure 10:
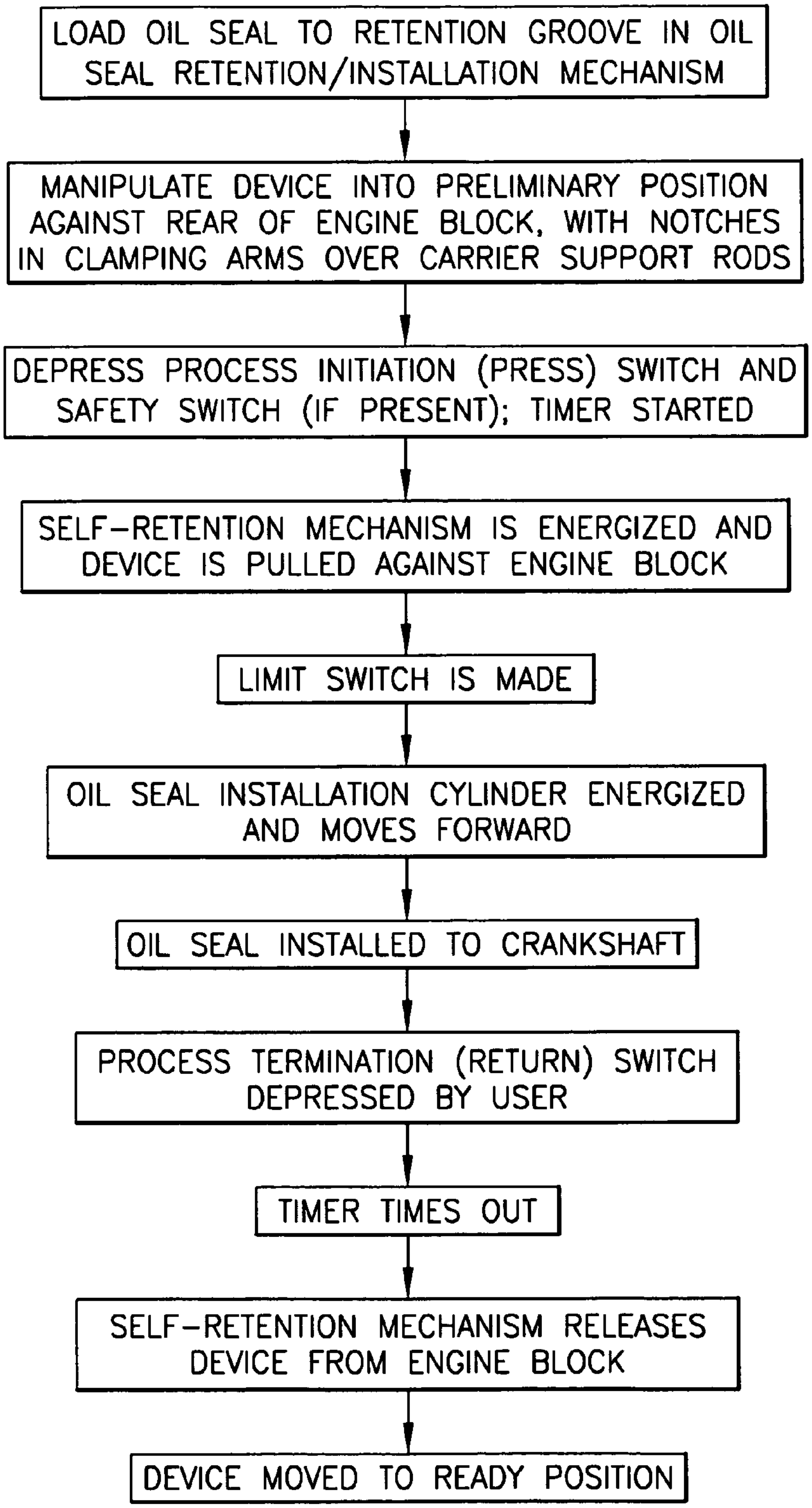
FIG. 10 is a process flow diagram illustrating the steps of an exemplary method of using a crankshaft oil seal installation device of the present invention to install an oil seal to a crankshaft of an internal combustion engine.

Operation of the crankshaft oil seal installation device 5 of the present invention can be better understood by a reading of the following description in conjunction with reference to FIGS. 1-3, the exemplary fluid circuit of FIG. 9, and the process flow diagram of FIG. 10.

As can be observed in FIGS. 1-3, a pair of operator handles 180 extend rearward from the sides of the crankshaft oil seal installation device 5. The handles 180 are shown to be connected to the clamping arms 40 by means of suitable brackets. It should be understood that the number and type of handles used, as well as the associated connection to the crankshaft oil seal installation device 5, may vary, and the embodiment shown is for the purpose of illustration only. The handles 180 are utilized by a user to manipulate the crankshaft oil seal installation device 5.

In this particular embodiment, one handle is provided with a safety switch and the other handle is provided with a process initiation switch—which forces a user of the crankshaft oil seal installation device 5 to use both hands to operate the device. In applications where this safety feature is not required, the safety switch may be eliminated.

In operation, an oil seal 150 is first loaded into the oil seal receiving/retention groove 100 (see FIG. 4). Once the oil seal 150 has been properly loaded, the user of the crankshaft oil seal installation device 5 moves it into a preliminary mating position against the engine block 115, with the notch 60 in each clamping arm 40 engaged with a respective assembly line engine block carrier support rod 140, and with the locating pin(s) 145 substantially aligned with the corresponding mating structure on the engine block.

Once the crankshaft oil seal installation device 5 has been placed in this position, the user energizes the device by simultaneously depressing both the safety switch SS and the process initiation (press) switch PS on the handles 180. This causes pressurized fluid from a source of pressurized fluid (not shown) to which the crankshaft oil seal installation device 5 is connected to flow through the fluid circuit of the device. The pressurized fluid flows toward both the clamping cylinders 45 and the oil seal installation cylinder 70. However, pressurized fluid is prevented from reaching the oil seal installation cylinder 70 until a limit switch LS (see FIG. 9) located on a mating face 20*a* of the front mounting plate 20 is depressed or otherwise made. As such, the clamping cylinders 45 are first energized, activating the self-retention mechanism 35 and pulling the crankshaft oil seal installation device 5 tightly against the engine block 115. If the alignment between the crankshaft oil seal installation device 5, the engine block 115, and the crankshaft 120 is correct, the limit switch LS will also be made. Depression of the safety switch SS and the process initiation (press) switch PS also starts a timer 185.

Once the limit switch is made, the pressurized fluid travels to the oil seal installation cylinder 70 where it causes extension of the piston rod 80 and activation of the oil seal retention/installation mechanism plunger sleeve 105. As the plunger sleeve 105 travels forward, it displaces the oil seal 150 from the oil seal receiving/retention groove 100 and moves it into position on the crankshaft 120. The longitudinal location of the oil seal 150 on the crankshaft 120 is controlled by the total linear displacement of the plunger sleeve 105. As this displacement will always be the same upon full stroke of the oil seal installation cylinder 70, the depth to which the oil seal 150 is installed is highly repeatable and accurate. One or more hard stops can be provided to help ensure that the forward stroke of the oil seal installation cylinder 70 always terminates at the same point.

At some point after the crankshaft oil seal installation device 5 has been caused to install the oil seal 150 to the crankshaft 120, the user presses a process termination (return) switch RS—which is preferably located on the same handle as the process initiation switch in order to afford the same previously described safety advantage. Although the return switch RS is shown in FIG. 10 as being depressed after the oil seal 150 has been installed to the crankshaft 120, it should be understood that the return switch RS may be pressed at virtually any point after the press switch PS has been depressed (i.e., after initiation of the oil seal installation process). However, regardless of when the return switch RS is depressed, the crankshaft oil seal installation device 5 cannot release itself from the engine block 115 until the timer 185 has timed out. In this manner, it can be ensured that the oil seal installation process has been completed before the device 5 unclamps from the engine block 115.

Once the return switch RS has been depressed and the timer 185 has timed out, the flow of pressurized fluid causes the clamping cylinders 45 and the oil seal installation cylinder 70 to retract, thereby releasing the crankshaft oil seal installation device 5 from its clamped position against the engine block 115. After the self-retention mechanism 35 has released the crankshaft oil seal installation device 5, the device may be moved away from the engine block 115 and supplied with a new oil seal 150 in preparation for the next oil seal installation process.

While certain embodiments of the present invention are described in detail above, the scope of the invention is not to be considered limited by such disclosure, and modifications are possible without departing from the spirit of the invention as evidenced by the following claims:

What is claimed is:

1. An automated crankshaft oil seal installation device, comprising:

a front mounting plate connected to a rear mounting plate, said plates arranged in a spaced apart relationship and adapted for linear movement relative to each other;

a self-retention mechanism for automatically drawing said front mounting plate into secure contact with a portion of an engine block that houses a crankshaft to which said oil seal will be installed, and for retaining said device in secure contact with said engine block during installation of said oil seal;

an oil seal installation cylinder affixed to said rear mounting plate and adapted to activate an oil seal retention/installation mechanism when extended;

an oil seal retention/installation mechanism extending through said front mounting plate, said oil seal retention/installation mechanism adapted to retain an oil seal prior to installation and to install said oil seal to said crankshaft when activated by said oil seal installation cylinder; and a source of pressurized fluid in communication with at least said oil seal installation cylinder.

2. The automated crankshaft oil seal installation device of claim 1, wherein said self-retention mechanism employs at least one clamping cylinder and at least one clamping arm to engage a portion of said engine block or a portion of an assembly line engine block carrier.

3. The automated crankshaft oil seal installation device of claim 1, further comprising one or more locating pins on said front mounting plate that are designed and located to mate with corresponding features on said engine block.

4. The automated crankshaft oil seal installation device of claim 1, further comprising one or more handles for allowing manipulation of said device by a user thereof.

5. The automated crankshaft oil seal installation device of claim 1, further comprising a connector for allowing said device to be operated in a suspended state.

6. The automated crankshaft oil seal installation device of claim 1, further comprising at least one guide post for controlling the linear movement of said front and/or rear mounting plates.

7. The automated crankshaft oil seal installation device of claim 1, further comprising cover plates for enclosing moving components of said device.

8. The automated crankshaft oil seal installation device of claim 1, further comprising an actuator plate residing between said oil seal installation cylinder and said oil seal retention/installation mechanism.

9. The automated crankshaft oil seal installation device of claim 1, further comprising a timer that, once an oil seal installation operation has been initiated, prevents said device from being released from said engine block before a predetermined amount of time has elapsed.

10. An automated crankshaft oil seal installation device for installing an oil seal to a driving end of an internal combustion engine crankshaft while said crankshaft resides in an engine block, said device comprising:

a front mounting plate connected to a rear mounting plate, said plates arranged in a spaced apart relationship and adapted for linear movement relative to each other;

a self-retention mechanism for automatically and releasably securing said crankshaft oil seal installation device to said engine block, said self-retention mechanism including a pair of clamping arms affixed at one end to said rear mounting plate and extending forward of said front mounting plate to engage a portion of an assembly line engine block carrier to which said engine block is connected, and a pair of clamping cylinders operative to drive said mounting plates apart, thereby causing said front mounting plate to be drawn into secure contact with said engine block;

an oil seal installation cylinder, a body portion of said oil seal installation cylinder attached to said rear mounting plate, with a piston rod extending from said body portion and in communication with an oil seal retention/installation mechanism;

an oil seal retention/installation mechanism extending through said front mounting plate and located to align with said crankshaft and an oil seal receiving aperture located in said engine block when said crankshaft oil seal installation device is properly mated thereto, said oil seal retention/installation mechanism including a cylindrical center portion having an outer diameter that is substantially the same as that of the portion of said crankshaft to which said oil seal will be installed, and an outer sleeve concentrically arranged around said center portion such that an oil seal retention groove is formed therebetween; and a source of pressurized fluid in communication with said clamping cylinders and said oil seal installation cylinder;

wherein, with an oil seal placed in said oil seal retention groove and said crankshaft oil seal installation device secured to said engine block by said self-retention mechanism, extension of said oil seal installation cylinder piston rod causes forward movement of a plunger sleeve residing between said center portion and said outer sleeve of said oil seal installation mechanism; and wherein, movement of said plunger sleeve causes said oil seal to be forced out of said oil seal retention groove, over said crankshaft, and into said aperture in said engine block.

11. The automated crankshaft oil seal installation device of claim 10, further comprising a slot or notch in each of said clamping arm for engaging said assembly line engine block carrier.

12. The automated crankshaft oil seal installation device of claim 10, further comprising one or more locating pins on said front mounting plate that are designed and located to mate with corresponding features on said engine block.

13. The automated crankshaft oil seal installation device of claim 10, further comprising one or more handles for allowing manipulation of said device by a user thereof.

14. The automated crankshaft oil seal installation device of claim 13, further comprising a process initiation button or switch on each handle that forces a user of said device to employ both hands when initiating an oil seal installation operation.

15. The automated crankshaft oil seal installation device of claim 10, further comprising a connector for allowing said device to be operated in a suspended state.

16. The automated crankshaft oil seal installation device of claim 10, further comprising a plurality of guide posts connected between said mounting plates for controlling the linear movement thereof.

17. The automated crankshaft oil seal installation device of claim 10, further comprising cover plates for enclosing moving components of said device.

18. The automated crankshaft oil seal installation device of claim 10, further comprising an actuator plate residing between and coupling said piston rod of said oil seal installation cylinder and said oil seal retention/installation mechanism.

19. The automated crankshaft oil seal installation device of claim 10, further comprising a timer that, once an oil seal installation operation has been initiated, prevents said device from being released from said engine block before sufficient time has elapsed for said installation to be completed.

* * * * *

UNITED STATES PATENT AND TRADEMARK OFFICE

CERTIFICATE OF CORRECTION

PATENT NO. : 7,526,847 B1
APPLICATION NO. : 11/089946
DATED : May 5, 2009
INVENTOR(S) : Arthur et al.

It is certified that error appears in the above-identified patent and that said Letters Patent is hereby corrected as shown below:

On the title page, section (56) References Cited, U.S. PATENT DOCUMENTS, please delete “5,013,050 A 5/1991 Curtis” and insert -- 5,013,050 A 5/1991 Lansdale --.

Signed and Sealed this

Eighth Day of December, 2009

David J. Kappos
*Director of the United States Patent and Trademark Office*